United States Patent
Cagnac et al.

(10) Patent No.: US 10,352,730 B2
(45) Date of Patent: Jul. 16, 2019

(54) INDUCTIVE ROTATION SENSOR WITH IMPROVED ACCURACY

(71) Applicant: SAFRAN ELECTRONICS & DEFENSE, Boulogne-Billancourt (FR)

(72) Inventors: Bastien Cagnac, Boulogne-Billancourt (FR); Jerome Piaton, Boulogne-Billancourt (FR); Kevin Brenugat, Boulogne-Billancourt (FR)

(73) Assignee: SAFRAN ELECTRONICS & DEFENSE, Boulogne-Billancourt (FR)

( * ) Notice: Subject to any disclaimer, the term of this patent is extended or adjusted under 35 U.S.C. 154(b) by 0 days.

(21) Appl. No.: 15/510,953

(22) PCT Filed: Sep. 14, 2015

(86) PCT No.: PCT/EP2015/070976
§ 371 (c)(1),
(2) Date: Mar. 13, 2017

(87) PCT Pub. No.: WO2016/041908
PCT Pub. Date: Mar. 24, 2016

(65) Prior Publication Data
US 2017/0254673 A1    Sep. 7, 2017

(30) Foreign Application Priority Data
Sep. 15, 2014  (FR) ...................... 14 58647

(51) Int. Cl.
*G01D 5/22* (2006.01)
*G01L 3/10* (2006.01)

(52) U.S. Cl.
CPC ............ *G01D 5/2291* (2013.01); *G01L 3/105* (2013.01)

(58) Field of Classification Search
CPC ................................... G01B 7/14; G01B 7/30
(Continued)

(56) References Cited

U.S. PATENT DOCUMENTS

| 2,498,282 | A | * | 2/1950 | Langer | .................... G01L 3/105 73/862.332 |
| 2,564,484 | A | * | 8/1951 | Kuehni | ................... H02K 49/00 336/135 |

(Continued)

FOREIGN PATENT DOCUMENTS

GB    2 050 623 A    1/1981

OTHER PUBLICATIONS

International Search Report in PCT/EP2015/070976 dated Oct. 27, 2015, with English translation.
(Continued)

*Primary Examiner* — Jay Patidar
(74) *Attorney, Agent, or Firm* — Womble Bond Dickinson (US) LLP

(57) ABSTRACT

The invention relates to a rotation sensor, comprising: —a stator (A) and rotor (B), arranged coaxially and forming a magnetic circuit (10, 20), the rotor being mounted angularly displaced with respect to the stator, —a primary winding, suitable for generating a magnetic field in the magnetic circuit, and —at least one secondary winding, characterized in that the magnetic circuit comprises at least one tooth (220) extending radially with respect to the axis (X-X) of the stator and of the rotor, and at least one notch (12) suitable for receiving said tooth, such that the tooth is separated from the notch by at least one tangential air gap (51) that is variable according to the angular displacement of the rotor with respect to the stator, the tooth and the notch being shaped so that, during a rotation of the rotor with respect to the stator, a variation in the width of the tangential air gap causes an increase or a decrease in the permeance of the air and, respectively, an increase or a decrease in the voltage at the terminals of the secondary winding.

8 Claims, 7 Drawing Sheets

(58) Field of Classification Search
USPC .................................... 324/207.16, 207.25
See application file for complete search history.

(56) References Cited

U.S. PATENT DOCUMENTS

| | | | | |
|---|---|---|---|---|
| 2,826,064 | A * | 3/1958 | Hastings | ................ G01L 3/105 |
| | | | | 73/862.332 |
| 2008/0258715 | A1 | 10/2008 | Reichert | |
| 2012/0068693 | A1 * | 3/2012 | Ocket | ................ G01D 5/2046 |
| | | | | 324/207.17 |

OTHER PUBLICATIONS

Search Report in French Application No. 1458647 dated May 22, 2015, with English translation coversheet.

* cited by examiner

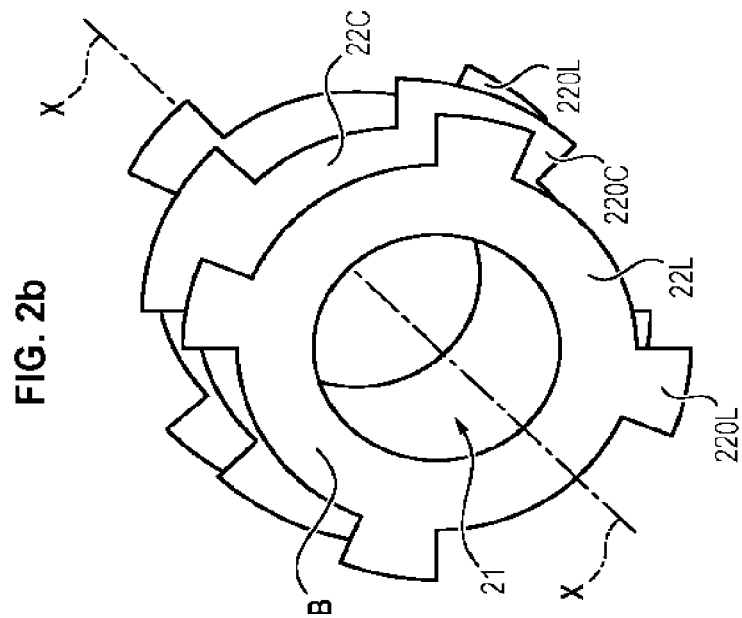
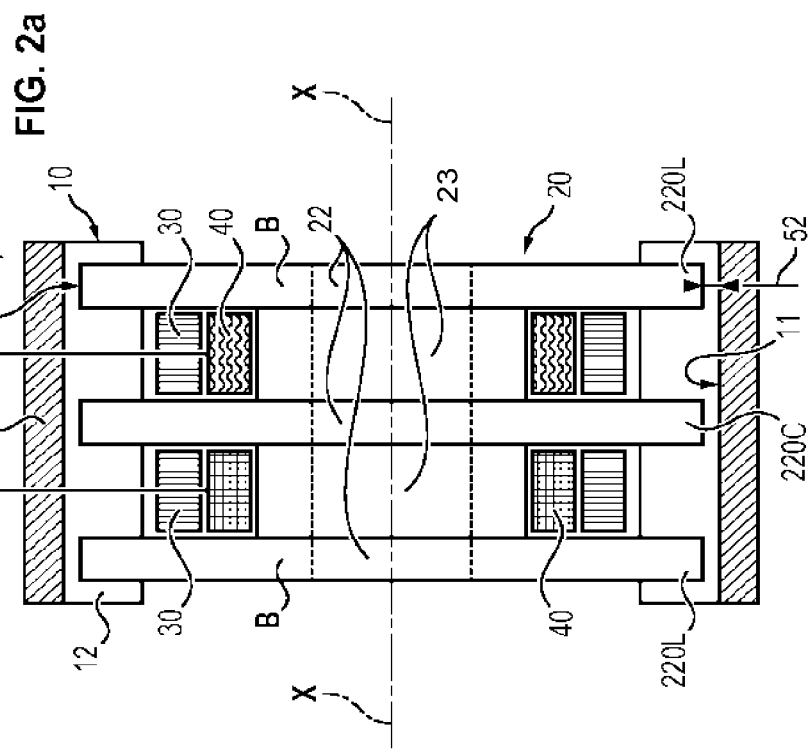

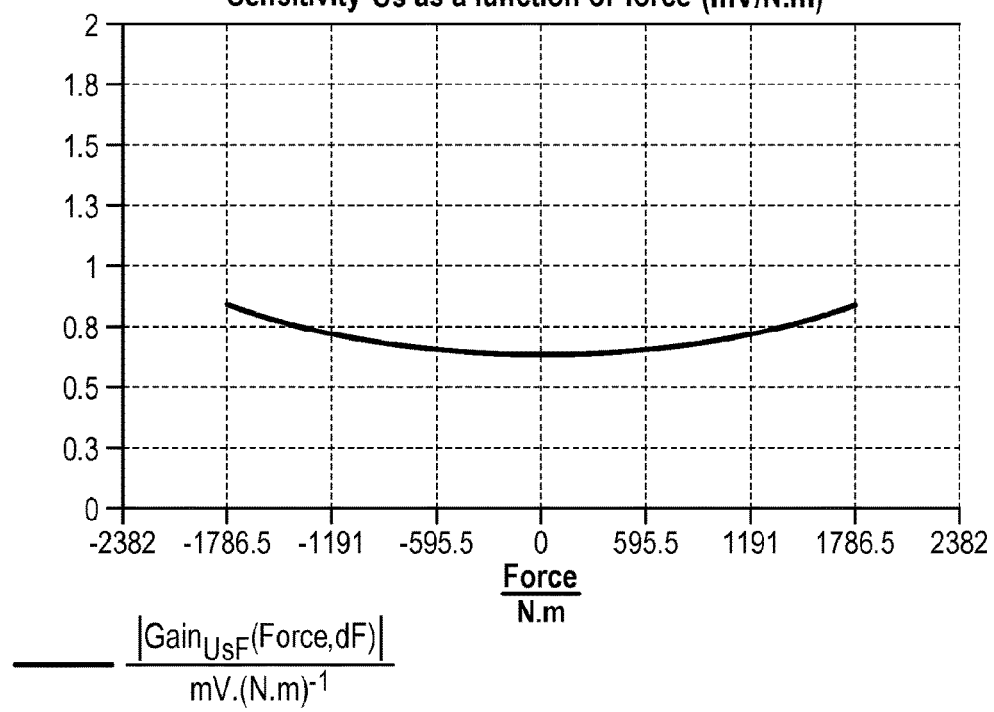

INDUCTIVE ROTATION SENSOR WITH IMPROVED ACCURACY

FIELD OF THE INVENTION

The field of the invention is that of rotation sensors, particularly sensors of the inductive type known under the acronym RVDT, for Rotary Variable Differential Transformer.

The invention is applicable in particular to the measurement of small angles of rotation between two shafts.

The invention finds advantageous application in measuring torque applied to a shaft.

PRIOR ART

It is known to measure torque output of an actuator by measuring torsion on the output shaft.

Several means of measurement have thus been proposed. For example, it is known to position one or more strain gauges on the output shaft of the actuator, the torsional deformation whereof can be measured to deduce therefrom the torque delivered by the actuator.

In a context where the actuator is a flight actuator in an aircraft, however, the use of strain gauges is undesirable because, these gauges being bonded to the output shaft, they are difficult to replace. In particular, they are not replaceable without disassembling the actuator from the aircraft: these are parts called "non-LRU" using the acronym for Line-Replaceable Unit, hence "non-replaceable on line."

A torsional deformation between two shafts can also be measured by the relative rotation between the shafts.

Rotation sensors, inductive sensors or RVDT sensors for example, are known.

These sensors comprise a rotor and a stator, respectively linked to a free shaft and a torsion shaft driven by an actuator.

A primary winding supplied with alternating current generates a magnetic field in a circuit formed by the rotor and the stator.

Two secondary windings produce, by reaction with this magnetic field, respective voltages the values whereof depend on the angular position of the rotor with respect to the stator.

It is thus possible to deduce, from measuring voltages at the terminals of the secondary windings, a relative rotation between the rotor and the stator.

Known RVDT sensors are adapted for measuring angles on the order of tens of degrees.

However, in this case, the torsion angles to be measured on an output shaft of a flight actuator are very small, on the order of 1° or less for example.

The use of a known RVDT sensor for measuring a torsion angle of such a shaft would therefore have very weak sensitivity, unless the stiffness of the output shaft were strongly reduced to increase the amplitude of the rotational movements of the output.

This is not desirable in the context of the invention. Thus there exists a need for a torque sensor by measurement of small deformations.

PRESENTATION OF THE INVENTION

The invention has the aim of proposing a rotation sensor having higher sensitivity.

Another goal of the invention is to propose a torque sensor by measurement of small-amplitude deformations of a shaft.

In this regard, the invention has as its object a rotation sensor comprising:
- a coaxial stator and rotor, the rotor being mounted with angular displacement with respect to the stator, the stator and the rotor forming a magnetic circuit,
- a primary winding, adapted for generating a magnetic field in the magnetic circuit when it is supplied with alternating current, and
- at least one secondary winding, adapted for having a potential difference at its terminals in response to a magnetic excitation, characterized in that the magnetic circuit includes at least one tooth extending radially with respect to the axis of the stator and of the rotor, and at least one notch adapted for receiving said tooth so that the tooth is separated from the notch by at least one so-called tangential air gap, variable depending on the angular displacement of the rotor with respect to the stator, and in that the tooth and the notch are formed so that during rotation of the rotor with respect to the stator, a variation in width of a tangential air gap causes an increase or a decrease of the permeance of the air gap and respectively an increase or a decrease of the voltage at the terminals of the secondary winding.

Advantageously, but optionally, the rotation sensor according to the invention can further comprise at least one of the following features:
- the magnetic circuit includes at least two axially aligned teeth and integral with one another, the notch being adapted for receiving the teeth so that each tooth is separated from the notch by at least one tangential air gap, the teeth and the notch being formed so that, when a tooth is separated from the notch by two tangential air gaps of identical widths, the other tooth is separated from the corresponding notch by two tangential air gaps of different widths, and preferably an air gap has a width greater than or equal to twice the width of the other air gap.
- the magnetic circuit includes at least three axially aligned teeth and integral with one another, comprising a central tooth and two lateral teeth, the notch being adapted for receiving the teeth so that each tooth is separated from the notch which receives it by at least one tangential air gap, the teeth and the notches being formed so that:
  - when the central tooth is separated from the notch by two tangential air gaps of identical widths, each of the two other teeth is separated from the notch by two tangential air gaps of different widths, and
  - the wider air gap extending between a lateral tooth and the notch is aligned with the narrowest air gap extending between the other lateral tooth and the notch.
- The sensor comprises two secondary windings, each winding being adapted for having a variable potential difference depending on the value of the width of the narrowest tangential air gap between a lateral tooth and the notch.
- The lateral teeth have an angular opening less than or equal to half the angular opening of the central tooth.
- Each tooth is further separated from a surface of its respective notch by a so-called radial air gap, and the smallest tangential air gap between a lateral tooth and the notch has a width less than that of the radial air gap.
- One of the rotor or the stator comprises at least two disks, each tooth being carried by a disk, and a cylinder extending between the disks, the primary winding and a secondary winding being wound around the cylinder.

The secondary winding is wound around the cylinder and the primary winding is wound around the secondary winding.

The sensor further comprises an acquisition and processing unit, adapted for measuring a voltage at the terminals of the secondary windings and for deducing therefrom a rotation angle of the rotor with respect to the stator.

The invention also has as its object an assembly comprising:
- a torsion shaft and a free shaft, concentric and mounted with angular displacement with respect to one another,
- an actuator, comprising a rotating output shaft driving the two shafts, and
- a rotation sensor according to the foregoing description, the rotor of the sensor being integral in rotation with the free shaft and the stator being integral in rotation with the torsion shaft, wherein the acquisition and processing unit of the sensor is further adapted for determining, from an angle of rotation of the rotor, a torque to which the torsion shaft is subjected.

The proposed rotation sensor makes it possible, through its structure comprising asymmetrical air gaps between the rotor and the stator, to detect even minimal relative rotation between the rotor and the stator. Thus it is possible to use such a sensor to measure torque directly on the output shaft of an actuator without impacting its stiffness.

DESCRIPTION OF THE FIGURES

Other features, aims and advantages of the invention will be revealed by the description that follows, which is purely illustrative and not limiting, and which must be read with reference to the appended drawings wherein:

FIG. 2a shows a section view of the sensor of FIG. 1, FIG. 2b shows a perspective view of the disks of the rotor of the sensor of FIG. 1.

FIG. 3e shows the sensitivity of the sensor as a function of torsional loading.

DETAILED DESCRIPTION OF AT LEAST ONE EMBODIMENT OF THE INVENTION

Structure of the Torque Sensor

Figure 1:
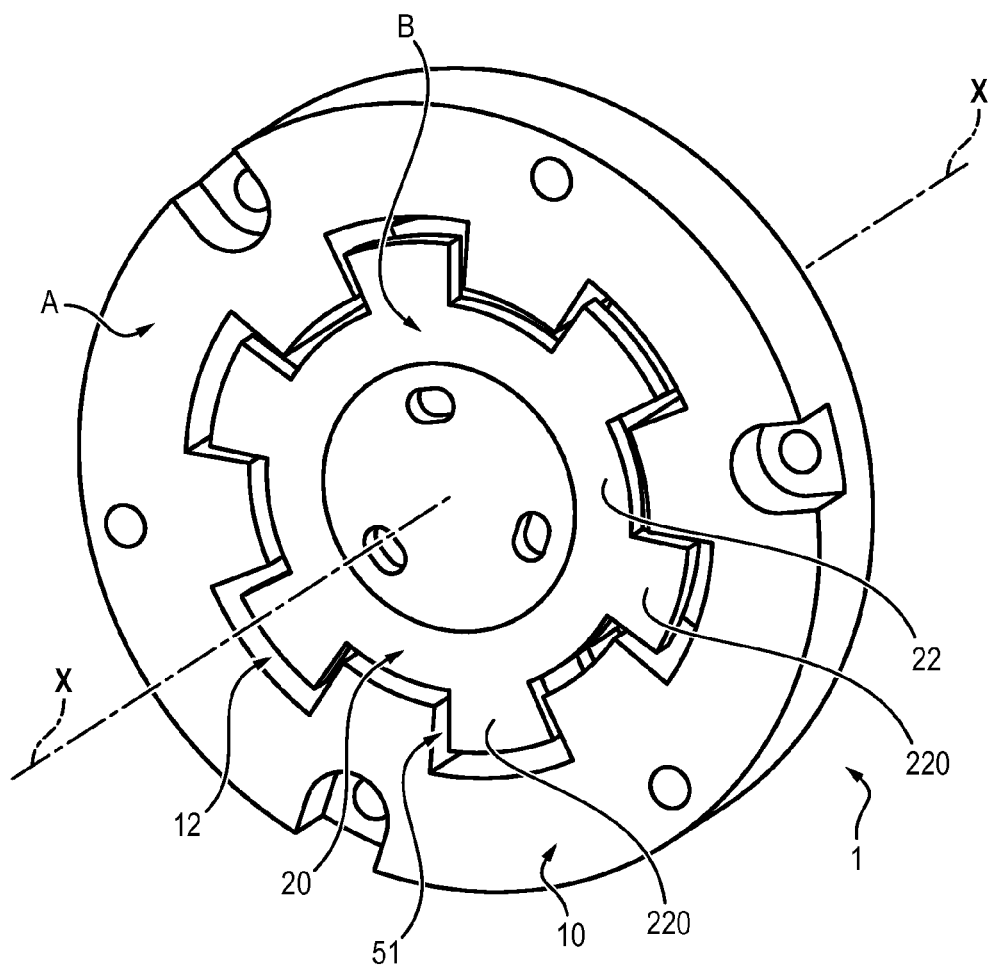
FIG. 1 shows a perspective view of a rotation sensor according to one embodiment of the invention.

Referring to FIG. 1, a rotation sensor 1 is shown.

This sensor comprises a stator A and a rotor B which are two concentric parts with an axis X-X. The rotor B is rotatably mounted with respect to the stator A, or at least, considering the small angles of rotation to be measured, mounted with angular displacement with respect to the stator.

Advantageously but optionally the stator A and the rotor B are axially symmetric parts about the axis X-X.

Together the stator A and the rotor B form a magnetic circuit. For this purpose, they are made of a magnetic material, iron for example.

The rotation sensor 1 further comprises a primary winding 30, which is adapted for generating a magnetic field in the magnetic circuit in response to the application to the winding of an alternating current.

Finally, the rotation sensor 1 comprises at least one secondary winding 40, which is adapted for having a potential difference in response to a magnetic excitation. In particular, the generation of a magnetic field in the magnetic circuit by the primary winding causes the appearance of a potential difference at the terminals of the secondary winding.

This potential difference varies in response to the angular displacement of the rotor with respect to the stator, as explained hereafter, and is measured by the acquisition and processing unit 50 of the sensor 1 to deduce therefrom the angle of rotation for the rotor with respect to the stator.

Advantageously, and as shown in the figures, the rotor extends inside the stator by being rotatably mounted inside it. Alternatively, the rotor B could extend around the stator A.

Thus, to preserve the generality of the invention, the radially external part is designated 10, this part possibly being either the rotor or the stator, and the radially internal part is designated 20.

The radially internal part 20 comprises at least one disk 22 coaxial with axis X-X. This part 20 preferably comprises two disks 22, coaxial and integral in rotation, and even more advantageously three disks 22, coaxial and integral in rotation. In this case the two lateral disks are designated 22L and the central disk 22C, positioned between the lateral disks at equal distances therefrom. Advantageously, the lateral disks 22L are located at the axial ends of the radially internal part 20, as can be seen for example in FIG. 2a.

In the case where the radially internal part 20 comprises two disks 22, it further comprises a cylinder 23 extending between the disks 22. In the preferred embodiment in which the part 20 comprises three disks, it comprises two cylinders 23, each cylinder extending between two adjoining disks. In this case, each cylinder 23 extends between the central disk 22C and a lateral disk 22L.

The disks 22 are integral in rotation. Advantageously, to accomplish this the disks 22 are formed in a single part with the intermediate cylinder(s) 23, so that the assembly of the disks 22 and the cylinders 23 forms a single single-piece part.

The disks 22 and the cylinders 23 of the rotor are formed from a magnetic material, from iron for example.

Advantageously, the radially internal part comprises a through opening 21 with a circular and centered section, thus making this part 20 tubular and hollow, so as to be able to attach a shaft. In this case, if the shaft is rotating, means for coupling the part 20 to the shaft in rotation are advantageously provided in the inner surface of the part, i.e. on the periphery of the opening 21.

Around each cylinder 23 is wound a portion of the primary winding 30 and a secondary winding 40. Advantageously, the cylinders 23 have a radius that is rigorously smaller than the radius of the disks 22, thus forming notches in which the windings can be positioned.

Moreover, as can be seen in FIG. 2a, each secondary winding 40 is advantageously wound directly around the respective cylinder 23, while the primary winding 30 is wound around the secondary windings, so as to obtain in succession, with an increasing radius with respect to the axis X-X:

A cylinder 23,

A secondary winding 40, and

A portion of the primary winding 30.

As explained hereafter, the magnetic circuit created by the rotor and the stator during excitation of the primary winding located at the radially outer ends of the disks 22, the primary winding 30 is thus located as close as possible to this circuit and magnetic field leakages are thus reduced.

It is thus understood that, when the part 20 comprises two disks, it comprises a single secondary winding, and when it comprises three disks, it comprises two secondary windings wound around the respective cylinders. This embodiment makes it possible, as described hereafter, to make the measurement of rotation insensitive to the excitation voltage, by carrying out a differential processing of the voltages of the secondary windings.

Magnetic Circuit

The magnetic circuit includes at least one tooth 220, extending radially with respect to the axis X-X, and a notch 12, adapted for receiving said tooth. The tooth 220 is mounted with angular displacement with respect to the notch 12. Advantageously, the tooth 220 is integral with the rotor or the stator, and the notch 12 is integral with the stator or the rotor, so that a rotation of the rotor relative to the stator causes a rotation of the tooth with respect to the notch.

In the non-limiting example that follows, shown in the figures, each tooth 220 is carried by a disk 22 of the radially internal part 20, and the notch 12 is carried by the radially external part. Alternatively, the notch 12 could consist of a plurality of notches formed on the disks, the notches being identical and aligned, and the teeth could be formed on a radially internal surface of the external part 10.

Figure 2C:
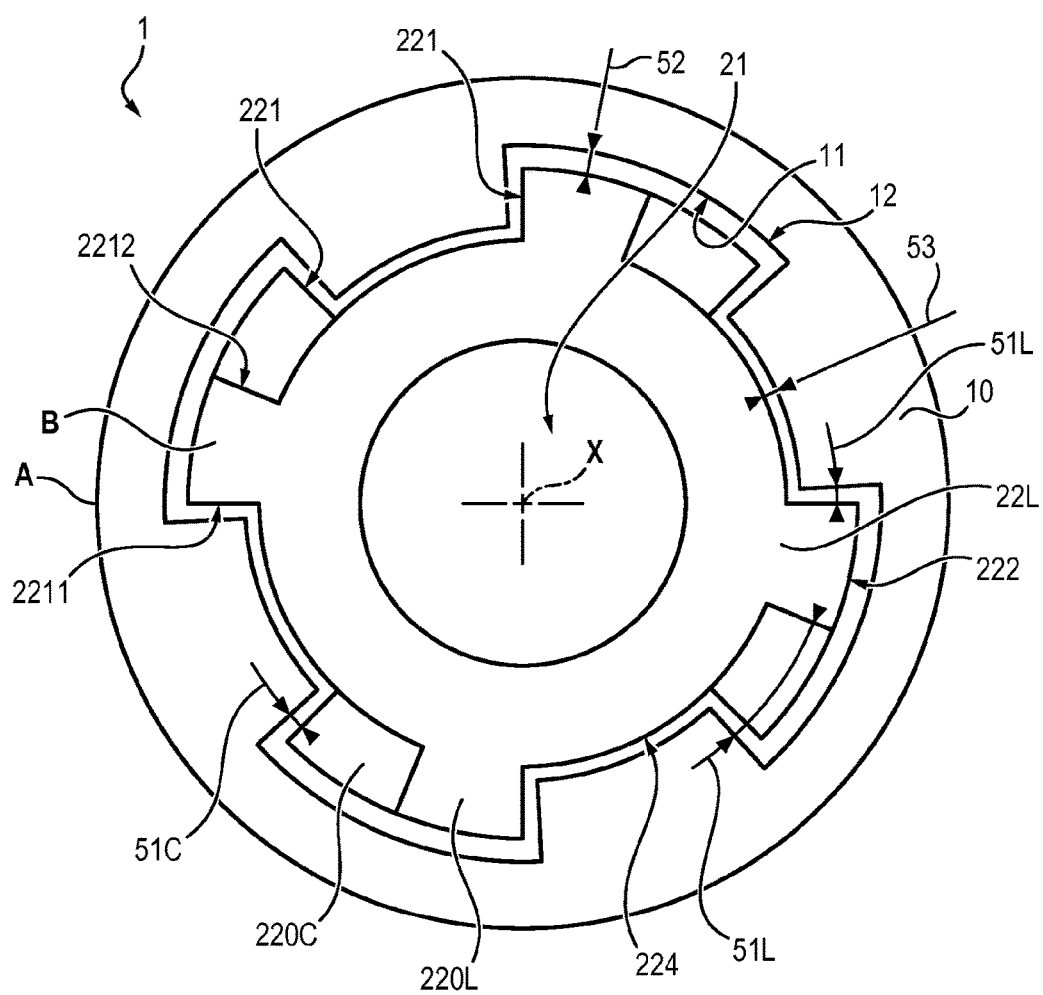
FIG. 2c shows a front view of the sensor of FIG. 1.

Referring again to the example of the figures, as shown in FIG. 2c, the radially external part 10 comprises, on a radially internal surface 11, at least one notch 12, extending along an axis parallel to the axis X-X, and having a constant angular opening over its entire length, i.e. over its entire axial extension. Alternatively, a notch 12 can be formed by several identical notches that are mutually aligned.

Preferably, the radially external portion 10 comprises a plurality of notches, all identical and distributed at constant angular intervals over the circumference of its internal surface 11, and each disk 22 has a plurality of protruding teeth 220, the teeth being received in the notches 12 of the stator so that each notch of the stator receives a tooth 220 of each disk 22 of the rotor 20.

Thus, if the external part 10 comprises a plurality of notches 12 distributed angularly over the internal surface 11 of the stator, then each disk 22 comprises as many teeth 220, the teeth of the same disk being identical, and distributed regularly over the circumference of the disk so that all the teeth 220 are received in corresponding notches 12.

As can be seen in FIG. 2c, each tooth 220 is therefore separated from a wall of the notch 12 which receives it by an interstice which comprises:

two tangential air gaps 51C and 51L which extend between the lateral walls 221 of a tooth and those 121 of the notch in which the tooth is located, the lateral walls being the walls extending in a plane parallel to the axis X-X, and advantageously radial, the air gap is therefore measured orthogonally to this plane, i.e. it is tangential around the axis X-X, A first radial air gap 52 at the tip of the tooth 220, extending between a radially external wall 222 of a tooth and the internal surface of the part 10 at the notch 12, and A second radial air gap 53, extending between the inner surface 11 of the part 10 between two consecutive notches 12 and the external surface 224 of the disk facing it.

The teeth 220 and the sections of the notches are preferably formed so that the widths of the tangential air gaps 51C and 51L, measured orthogonally to the lateral walls of the teeth 220 and the notches, are constant over the entire surface of the air gap.

The sensor 1 comprises at least one tooth-notch couple formed in such a manner that a rotation of the rotor with respect to the stator causes a variation in width of a tangential air gap 51C between the tooth 220 and the notch 22, inducing a variation of the potential difference at the terminals of the secondary winding 40. Advantageously, referring to FIGS. 2b and 2c, the magnetic circuit comprises at least one tooth 220 formed so that the tangential air gaps 51C and 51L extending on either side of the tooth have different widths. Moreover, one of the tangential air gaps 53 advantageously has a width greater than or equal to at least twice the other tangential air gap, to minimize the magnetic field passing through the larger air gap.

In this manner, during rotation of the rotor with respect to the air gap, the tooth 220 approaches or moves away from the notch 12 at its narrowest tangential air gap, causing respectively an increase or a decrease of the permeance of the air gap, and consequently an increase or a decrease of the voltage at the terminals of the secondary winding. On the other hand, at the larger air gap, the magnetic field passing through this air gap remains negligible no matter what the angular displacement of the tooth in the notch is.

In the embodiment where the internal part 20 comprises two disks 22, the teeth 220 of a disk 22 are formed so that the tangential air gaps 51C and 51L between each tooth 220 of the disk and the notch are asymmetrical with respect to the tooth, when the tangential air gaps between the teeth of the other disk and the notch are symmetrical.

The first disk, forming the asymmetrical air gaps, induces, by its relative rotation in the external part, a variation in the magnetic field, and the second disk closes the magnetic circuit while having no impact on the field.

In the preferred embodiment where the internal part 20 includes three disks, the teeth 220L of the lateral disks 22L are formed so that the tangential air gaps between each tooth 220L and the notch 12 are asymmetrical, having in particular different widths, when the tangential air gaps between the teeth 220C of the central disk 22C and the notch are symmetrical.

Moreover, for each notch 12, the largest lateral air gap for the tooth 220L of a first lateral disk 22L corresponds to the narrowest lateral air gap for the tooth 220L of the other lateral disk 22L. Thus the narrowest air gap on the side of a first lateral disk is facing the largest air gap on the side of the other lateral disk.

It has been indicated above that in this case the sensor comprises two secondary windings 40, each winding being wound around a respective cylinder.

It is understood that in this case the secondary windings 40 are not subjected to the same magnetic field and therefore do not have the same potential difference at their terminals according to the direction of rotation of the rotor with respect to the stator.

In fact, for a lateral disk 22L, the narrowest tangential air gap is still located on the same side with respect to a tooth. If the rotor turns with respect to the stator so as to reduce the width of the air gap, the permeance of this air gap increases, and the voltage at the terminals of the corresponding secondary winding also increases. However, the permeance of the narrowest air gap of the other lateral disk 22L is reduced with the rotation of the rotor, and therefore reduces the voltage at the terminals of the corresponding secondary winding.

Thus, this configuration makes it possible to vary the voltage at the terminals of each secondary winding depending on the direction of rotation of the rotor, and thus to determine this direction of rotation from the voltage measured on the secondary windings.

In this case, all the teeth 220L of a lateral disk 22L are formed identically so that the largest air gap is always located on the same side of the tooth, to maximize the variation in permeance of the total air gap between the disk and the external part 10 in case of relative rotation of the two parts.

According to a preferred embodiment, the teeth 220L of the lateral disks 22L have a reduced angular opening with respect to the disks 220C of the central disk. In the event that the sensor comprises only two disks, the teeth of the disk corresponding to the asymmetric air gaps has a reduced angular opening with respect to the teeth of the other disk.

Advantageously, the angular opening of the teeth 220L of the two lateral disks is identical and less than or equal to 50%, and preferably less than 30%, of that of the teeth 220C of the central disk 22C.

Moreover, in each notch, as can be seen in FIG. 2b, the teeth are advantageously positioned relative to one another as follows:
  A first lateral wall 2211 of a tooth 220C of the central disk is aligned with a corresponding lateral wall of a tooth 220L of a first lateral disk, and
  The opposite lateral wall 2212 of the tooth 220C is aligned with the corresponding lateral wall of the tooth 220L of the second lateral disk.

The operation of this sensor will now be described.

The description that follows applies to the preferred embodiment wherein:
  The radially internal part 20 includes three disks, for differentiating the direction of rotation of the rotor,
  The radially internal part 20 is the rotor, and the external part 10 is the stator, and
  The radially internal part 20 carries the teeth, and the external part 10 the notches.

The same functionality would be obtained in the variant embodiments of the sensor wherein the rotor and the stator, and/or the positions of the teeth and the notches, are interchanged.

The primary winding 30, supplied with an electric current, generates a magnetic field in each cylinder.

The magnetic field passes through each lateral disk, then toward the rotor or through an air gap.

According to the configuration described previously, the largest lateral air gap of a tooth—for example on the side opposite to that where the walls of a lateral disk and of the central disk are aligned—is sufficiently large so that the magnetic flux passing through this air gap is negligible.

Thus, the magnetic field generated by the primary winding favors, for each tooth of a lateral disk, the narrowest lateral air gap.

It then circulates through the stator, then a lateral air gap of a tooth of the central disk, which generates a voltage in the secondary winding located between the central disk and the lateral disk in question.

However, the narrowest air gap, also called the measurement air gap, advantageously has a width that is less than 0.5 mm, and advantageously 0.3 mm when the relative rotation of the rotor and of the stator is zero, i.e. when the air gaps on either side of a tooth of the central disk are equal.

Due to this dimension, the permeance of the air gap varies significantly in the event of rotation of the rotor in the stator, which induces a variation in voltage in the secondary windings and allow the amplitude of the relative rotation of the rotor and the stator to be deduced therefrom.

Finally, in each notch of the stator, as the narrowest air gaps are located on opposite sides for the teeth of the two lateral disks, the permeances of each air gap (hence the voltages of the corresponding secondaries) have slopes of opposite sign for a given relative rotation. This makes it possible to deduce from the voltages at the secondary terminals the direction and the absolute value of the relative rotation between the rotor and the stator.

Thus for example, in the configuration shown in FIG. 2c: if the rotor rotates to the left in the plane of the figure, the width of each measurement air gap at the first lateral disk is reduced. The permeance of each air gap is increased, and the voltage of the secondary winding corresponding to this disk increases.

The other lateral disk (not visible) is located on the other side of the central disk. For this disk, the width of the measurement air gap increases when the rotor turns to the left, and therefore its permeance is reduced. The result is that the voltage of the secondary winding corresponding to this disk is reduced.

Thus, by reading the voltages of the two secondary windings, the direction of the rotation and the amplitude of the rotation of the rotor in the stator are deduced.

Experimental data of a sensor the type previously described are shown in FIGS. 3a to 3e.

The dimensions of this sensor are an inner diameter (at the through opening 21) of 15 mm, and an outer diameter, at the radially external surface of the stator, of 40 mm.

The measurement air gap of each tooth has a width of 0.3 mm when the air gaps on either side of the teeth of the central disk are equal. The tangential air gaps 52 and 53 have widths of 0.6 mm.

Finally, the stator has four notches and each disk has four teeth, the teeth of the lateral disks 22L having an angular opening of 20% of those of the central disk 22C.

Figure 3A:
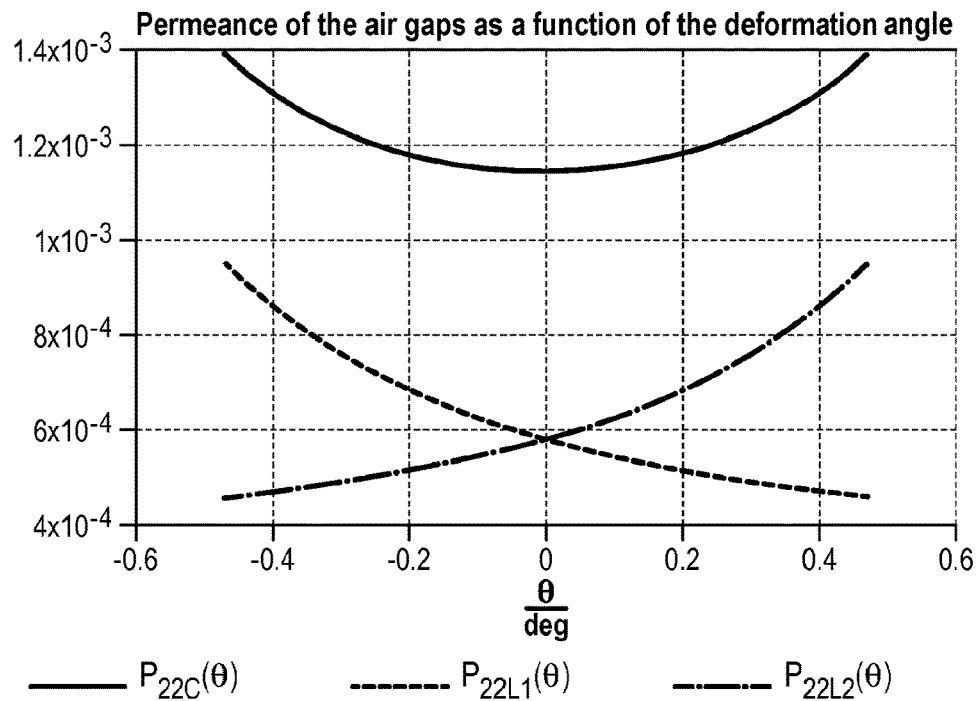
FIG. 3a shows the magnetic permeance of the air gaps of a sensor according to one embodiment of the invention depending on the relative angle of rotation of the rotor and the stator.

In FIG. 3a, the permeance of the measurement air gaps are shown as a function of the deformation angle. The permeances of the measurement (narrowest) air gaps of the two lateral disks are designated $P_{22L1}$ and $P_{22L2}$, and the permeance of the central disk (cumulated permeances of the lateral air gaps) are designated P22C.

The permeance is supplied by the formula:

$$P = \frac{\mu . S}{l},$$

where μ is the magnetic permeability of the medium, S the section area of the air gap, and l its width.

One notes in FIG. 3a that the permeance of the air gaps of a lateral disk increases with the rotation angle, when the permeance of the other disk is reduced.

Figure 3B:
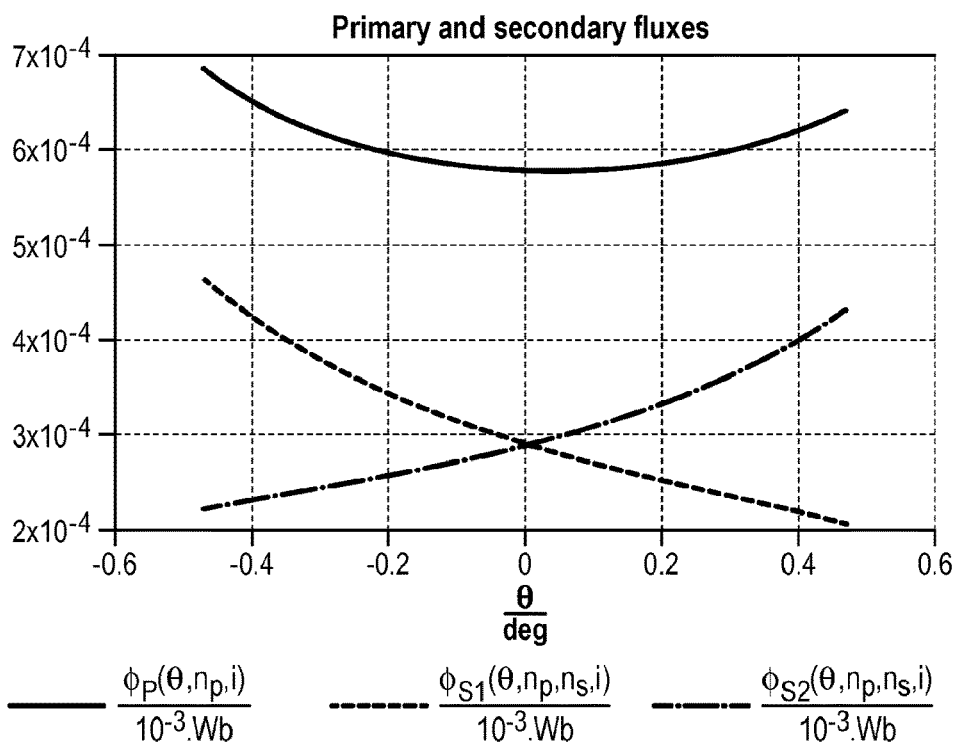
FIG. 3b shows the magnetic flux in the primary and secondary windings of the sensor as a function of the angle of rotation.

In FIG. 3b, the values of the magnetic fluxes at the primary winding 30 and at the secondary windings 40 are shown, designating $\phi_P$ and $\phi_S$ as the Magnetic Fluxes at the primary and at the secondary, $n_p$ and $n_s$ as the number of turns of the corresponding windings, and i the current in the primary winding.

The magnetic fluxes at the secondary vary depending on the permeance of the air gaps.

Figure 3C:
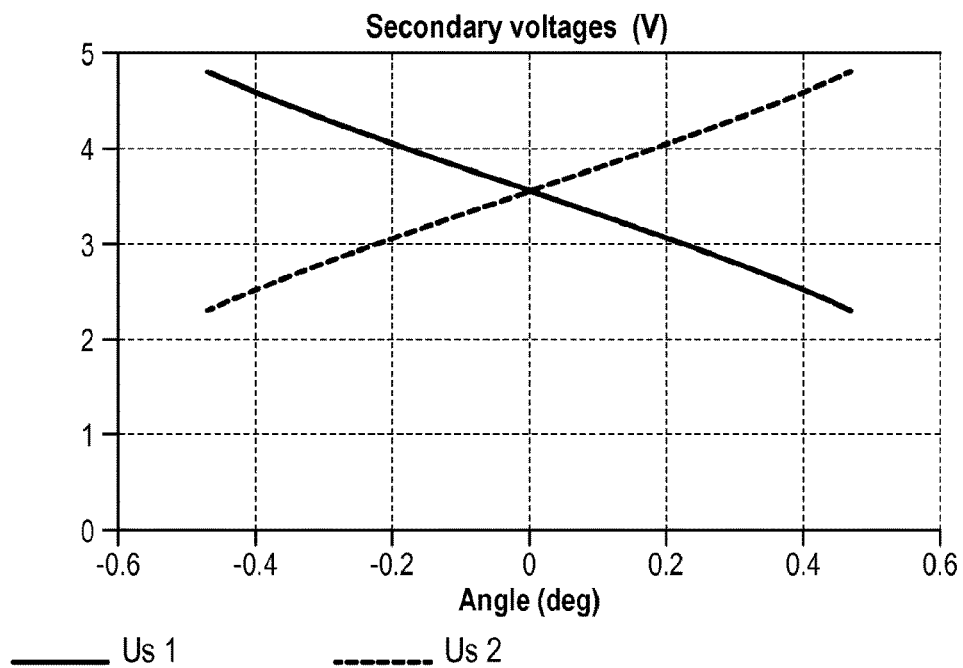
FIG. 3c shows the voltages in the secondary windings of the sensor as a function of the angle of rotation.

In FIG. 3c, the values of the voltages on the secondaries induced by the magnetic fluxes are shown. It is noted in the figure that the value of the voltage at each winding supplies information both on the value of the angle of rotation between the rotor and the stator, but also on the direction of rotation.

Figure 3D:
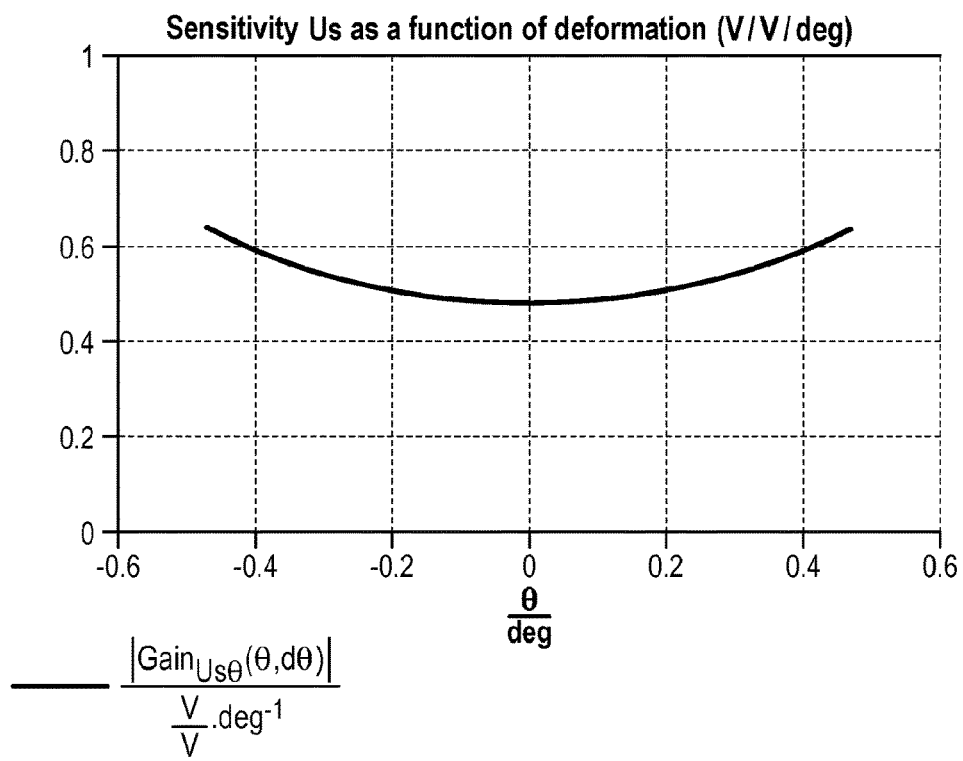
FIG. 3d shows the sensitivity of the sensor as a function of the angle of rotation.

Expressing the sensitivity of the sensor in VN/deg, this sensitivity is shown in FIG. 3d. Sensitivity of the sensor is noted for angles starting with 0.1 or 0.2°, which demonstrates increased accuracy with respect to RVDT type sensors previously proposed, for which the sensitivity is on the order of a few degrees.

Figure 4:
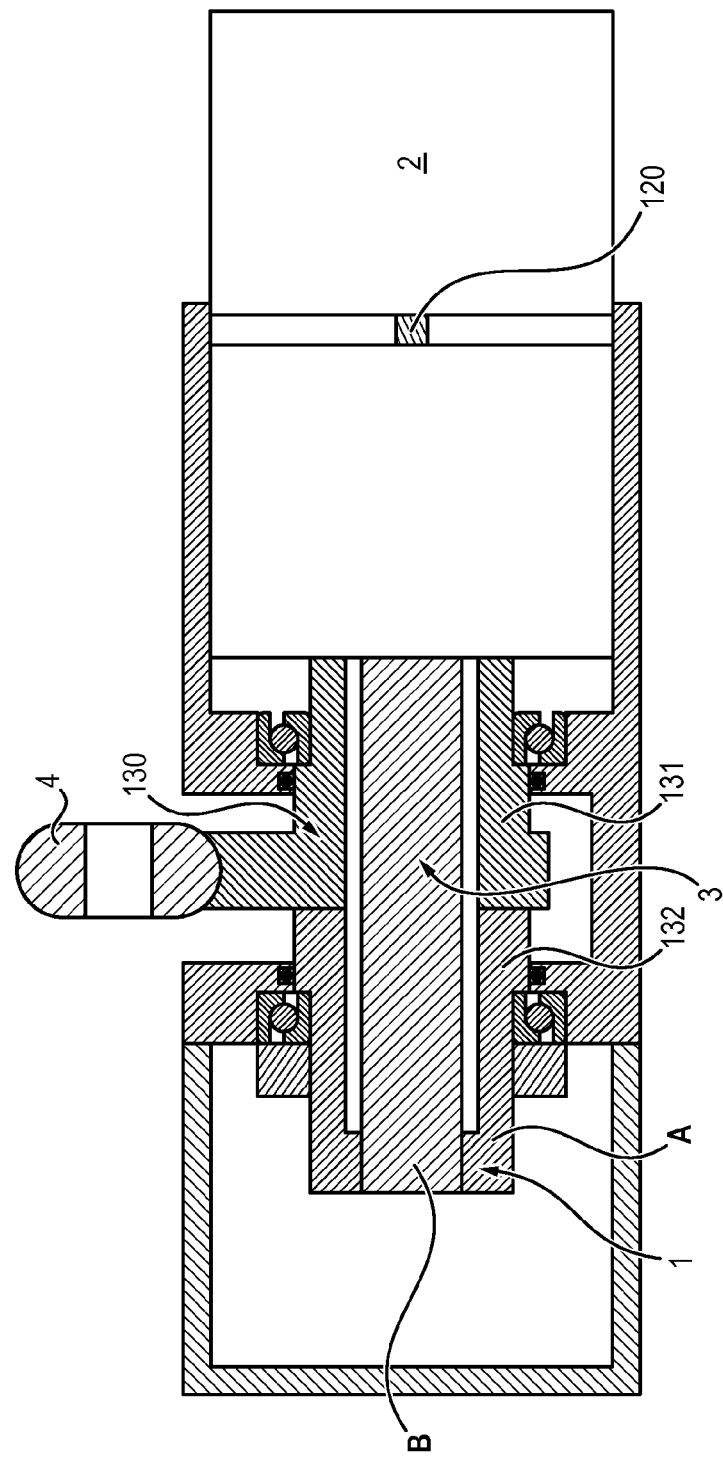
FIG. 4 shows schematically an assembly comprising an actuator and a torque sensor.

Shown in FIG. 4 is the use of the sensor 1 for measuring the torque delivered by an actuator.

FIG. 4 shows an assembly comprising an actuator 2, comprising a rotating output shaft 120 driving a torsion shaft 130, or test body, on which is mounted a load 4 to be driven. Shown by 131 is the portion of the torsion shaft driving the load 4, and by 132 the end portion of the shaft beyond the load, this portion not be subjected to the torque transmitted to the load.

The assembly further comprises a shaft 131 coaxial with the torsion shaft. This shaft 3 not being subjected to a torque, it is not deformed.

The two shafts are driven in rotation by the output shaft of the actuator.

The sensor is positioned so that the stator A is integral in rotation with one of the shafts, advantageously the torsion shaft, and the rotor B is integral in rotation with the other shaft, advantageously the free shaft. The sensor is positioned at the opposite end of the shafts with respect to the actuator so as not to hinder the transmission of torque between the actuator and the torsion shaft 3 to drive the load.

The processing unit 50 of the sensor therefore measures a relative rotation between the free shaft and the torsion shaft. In this case, where the rotation sensor is used as a torque sensor, the processing unit 50 is further adapted to deduce, from a value of a relative angle between the torsion shaft and the free shaft, a torque applied by the actuator to the torsion shaft, depending on the stiffness of the torsion shaft, this torque being the result of the product of the stiffness and the absolute value of the angle measured.

For a torsional stiffness of 3800 N·m/deg of the torsion shaft, a sensitivity is obtained for the torque sensor 1, depending on the force, shown in FIG. 3e. This sensitivity corresponds to the slope of the voltages of the secondary windings as a function of the torque applied by the actuator to the torsion shaft.

Thus the proposed sensor has an elevated sensitivity for small rotations and therefore makes it possible to measure the torque delivered by an actuator without affecting the stiffness of its output shaft.

The invention claimed is:

1. A rotation sensor, comprising:
a coaxial stator and rotor, the rotor being mounted with angular displacement with respect to the stator, the stator and the rotor forming a magnetic circuit,
a primary winding configured for generating a magnetic field in the magnetic circuit when it is supplied with alternating current, and
at least one secondary winding configured for having a potential difference at its terminals in response to a magnetic excitation,
wherein the magnetic circuit includes a first tooth and a second tooth, both teeth 1) extending radially and are axially aligned with respect to an axis of the stator and of the rotor and 2) integral with one another, and a notch configured for receiving both teeth so that, when the first tooth is separated from the notch by a first pair of tangential air gaps of identical widths, the second tooth is separated from the notch by a second pair of tangential air gaps of different widths, a wider tangential air gap of the second pair of tangential air gaps has a width greater than or equal to twice the width of a narrower tangential air gap of the second pair of tangential air gaps,
wherein the second pair of tangential air gaps are variable depending on the angular displacement of the rotor with respect to the stator, and in that the second tooth and the notch are configured so that during rotation of the rotor with respect to the stator, a variation in widths of the second pair of tangential air gaps causes an increase or a decrease of a permeance of the narrower tangential air gap and respectively an increase or a decrease of a voltage at the terminals of the secondary winding.

2. The rotation sensor according to claim 1, wherein the magnetic circuit further includes a third tooth axially aligned with the first tooth and the second tooth along the axis of the stator and of the rotor, and being integral with the first tooth and the second tooth,
the notch being configured for receiving the third tooth, the teeth and the notch being configured so that:
when the first tooth is separated from the notch by the first pair of tangential air gaps of identical widths, the second tooth is separated from the notch by the second pair of tangential air gaps of different widths, and the third tooth is separated from the notch by a third pair of tangential air gaps of different widths, wherein the third pair of tangential air gaps has a wider tangential air gap and a narrower tangential air gap, and
the wider tangential air gap of the second pair is aligned with the narrower tangential air gap of the third pair.

3. The rotation sensor according to claim 2, wherein the secondary windings comprises two windings, each winding being configured for having a variable potential difference depending on a value of the width of at least one of the narrower tangential air gaps.

4. The rotation sensor according to claim 1, wherein the second tooth is further separated from a surface of its respective notch by a radial air gap,
wherein the narrower tangential air gap between the second tooth and the notch has a width less than that of the radial air gap.

5. The rotation sensor according to claim 1, wherein one of the rotor or the stator comprises at least two disks, each tooth being carried by a separate disk, and a cylinder extending between the disks, the primary winding and the secondary winding being wound around the cylinder.

6. The rotation sensor according to claim 5, wherein the secondary winding is wound around the cylinder and the primary winding is wound around the secondary winding.

7. The rotation sensor according to claim 6, further comprising an acquisition and processing unit, configured for measuring the voltage at the terminals of the secondary windings and for deducing therefrom an angle of rotation of the rotor with respect to the stator.

8. An assembly comprising:
- a torsion shaft and a free shaft, concentric and mounted with angular displacement with respect to one another,
- an actuator, comprising a rotating output shaft driving said torsion shaft and the free shaft, and
- a rotation sensor according to claim 7, the rotor of the sensor being integral in rotation with the free shaft and the stator being integral in rotation with the torsion shaft, wherein the acquisition and processing unit of the sensor is further configured for determining, from the angle of rotation of the rotor, a torque to which the torsion shaft is subjected.

* * * * *